UNITED STATES PATENT OFFICE.

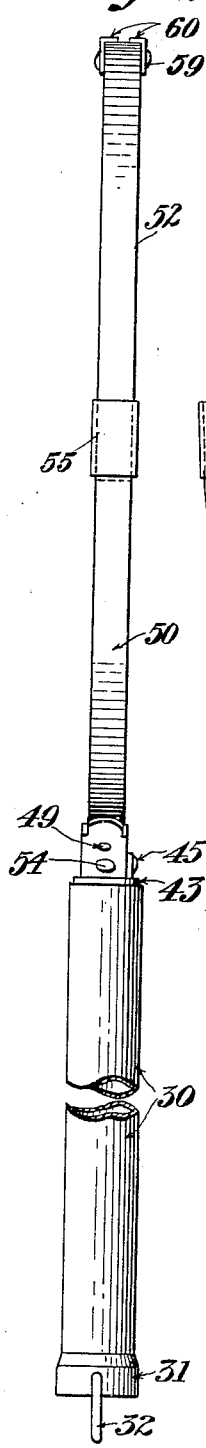
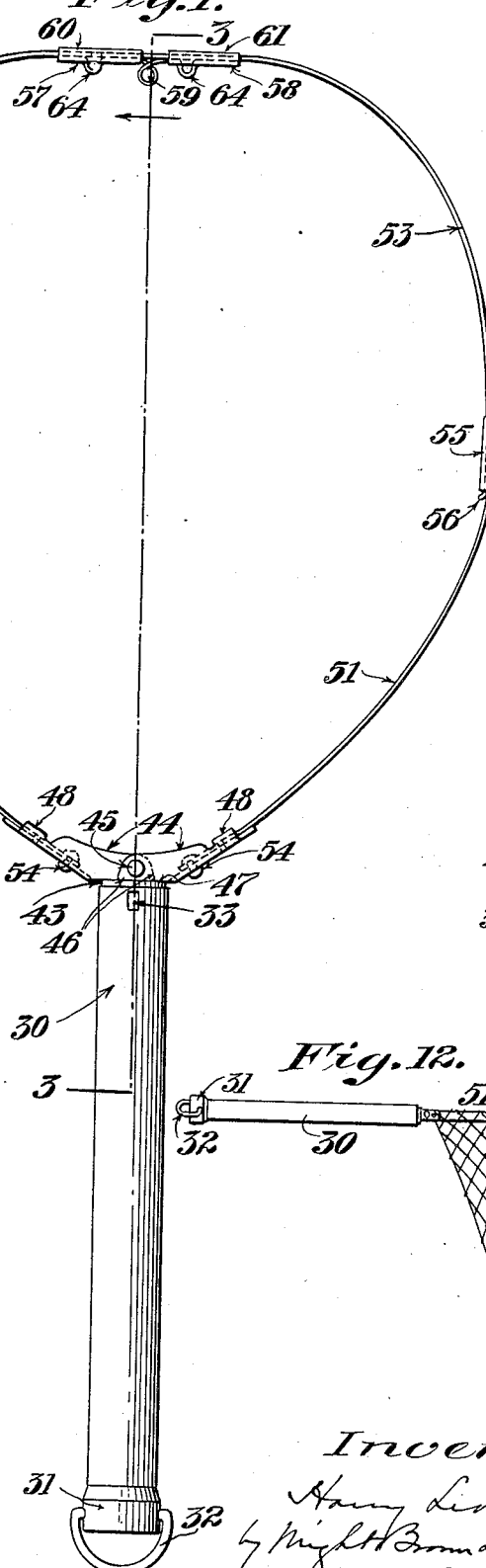
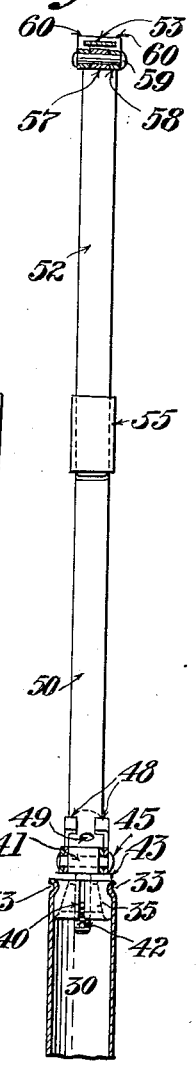
H. LEVY.
COLLAPSIBLE LANDING NET HOLDER.
APPLICATION FILED JUNE 17, 1912.
1,077,481.
Patented Nov. 4, 1913.
2 SHEETS—SHEET 1.

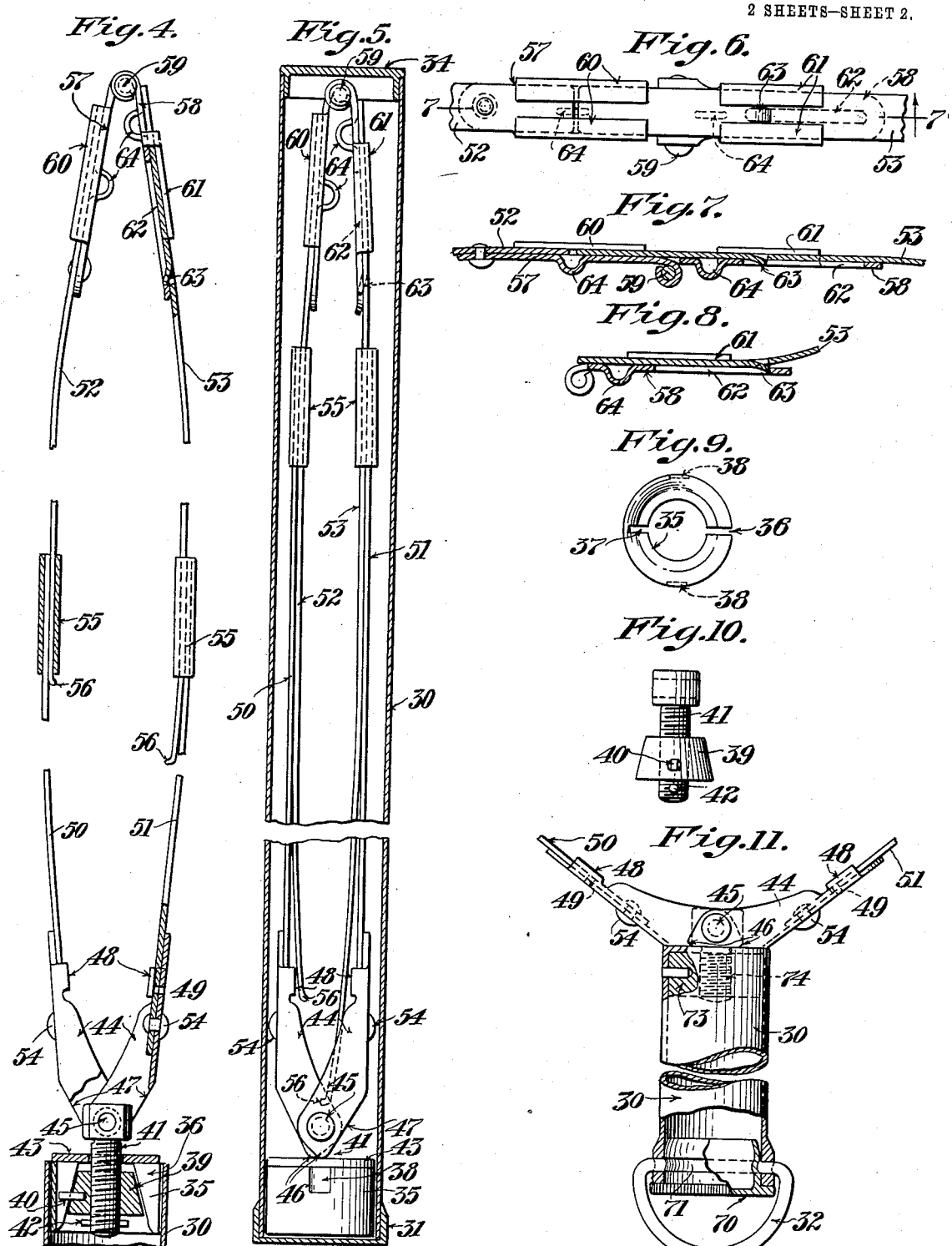

HARRY LEVY, OF BOSTON, MASSACHUSETTS.

COLLAPSIBLE-LANDING-NET HOLDER.

1,077,481.  Specification of Letters Patent.  Patented Nov. 4, 1913.

Application filed June 17, 1912.  Serial No. 704,054.

*To all whom it may concern:*

Be it known that I, HARRY LEVY, a citizen of the United States, and a resident of Boston, in the county of Suffolk and State of Massachusetts, have invented certain new and useful Improvements in Collapsible-Landing-Net Holders, of which the following is a specification.

This invention relates to fish nets of the type comprising a net and hoop-shaped frame from which a bag-shaped net is strung, such devices being especially employed for the landing of fish caught by anglers.

The principal object of my invention is to provide a net of this character which, when in use, will be large enough for all desired purposes but which may be collapsed so as to occupy an exceedingly small space.

A further object of the invention is to provide a landing net which is variable in size so as to be adapted to the particular fish for which the user is angling.

To these ends my invention consists in a landing-net having the hoop frame for the net variable in size, and adapted to be stored, with the net, within the handle of the device.

The invention further consists in the improvements which I will now proceed to describe and claim.

Of the accompanying drawings:—Figure 1 is a plan view illustrating the invention in one of its embodiments, the net being omitted. Fig. 2 is an edge view of the same. Fig. 3 represents a section on line 3—3 of Fig. 1. Fig. 4 is an elevation, partly in section, of the frame portion of the device and showing a small portion of one end of the handle. Fig. 5 is an elevation, partly broken out, to illustrate the collapsed condition of the device, said figure omitting the net to avoid confusion. Fig. 6 is a detail plan view looking from the top of Fig. 1, and on a slightly larger scale. Fig. 7 represents a section on line 7—7 of Fig. 6. Fig. 8 is a view similar to a portion of Fig. 7, but illustrating how certain parts hereinafter described may be disconnected. Fig. 9 is a detail plan view of the slide lock shown at the bottom of Fig. 5. Fig. 10 is a detail elevation of the cone wedge and the screw shown at the bottom of Fig. 4. Fig. 11 is a view similar to a portion of Fig. 1, but illustrating a modification hereinafter described. Fig. 12 is a side elevation, on a reduced scale showing the complete device with the parts assembled for use.

The same reference characters indicate the same parts in all the figures.

Referring first to Figs. 1 to 10 inclusive, the handle comprises a tubular member 30 preferably of brass or steel tubing, which handle is adapted to contain the net and its hoop frame. One end of the handle which for convenience I shall refer to as the outer end, is provided with a cap 31 having a bail 32. This cap may be permanently secured in position, or it may, if desired, be removable as hereinafter described in connection with Fig. 11. The other end of the handle which for convenience I shall refer to as the inner end, is formed or provided with one or more lugs 33. To close said inner end of the handle when the net and its frame is stored therein, I employ a suitable removable cap such as indicated at 34 in Fig. 5. Fitting within the tubular handle and slidable therein is a block 35 (Figs. 4, 5 and 9) said block having a central cone shaped aperture, the block being cut through as at 36 and recessed or grooved as at 37 so that said block is expansible. Externally the block is cylindrical and at its outer end it is formed with one or more depressions or recesses 38 to receive the lug or lugs 33 of the handle when said block is slid to the position shown in Figs. 1, 3 and 4. Fitting within the block is a cone wedge 39 having a radial pin 40 (see Figs. 4 and 10) which pin extends into the slot 36 to prevent rotation of the said cone wedge within the block and to also prevent undue collapsing of the expansible block. The cone wedge is cylindrically apertured and internally threaded to receive a screw 41 through which a transverse pin 42 extends to prevent the cone wedge from escaping from the screw although permitting sufficient relative movement of the screw and wedge to secure the clamping action hereinafter described. A washer 43 is mounted on the screw above the slide block 35 to receive the pressure of the toes of the net frame presently described, and prevent said toes from catching in the slot 36 or groove 37 of the expansible block.

The inner arms or hinge members 44 of the hoop frame are connected by a pintle 45 to the head of the screw 41, the sides of said screw head being preferably flattened where the sides of the arm 44 bear against said screw head. The arms 44 are pressed to the form shown by comparing Figs. 3, 4 and 5 and are provided with toes 46 and with straight or flattened portions 47 adjacent said toes as best shown in Fig. 5. The arms 44 are formed with inwardly bent ears 48 to embrace the inner ends of the strips which constitute the hoop frame, holes 49 being formed to permit tie cords for securing the netting in place, to be employed.

The hoop frame consists of four strips 50, 51, 52 and 53, said strips being resilient and preferably of spring steel. The inner ends of the strips or members 50, 51, extend under the ears 48 and are secured to the arms 44 by rivets 54. The outer ends of said members 50, 51, have flat sleeves 55 sweated or brazed or otherwise rigidly secured thereto, said sleeves being of a size to also inclose the inner ends of the strips or members 52, 53, with sufficient looseness to permit the latter to be slid through the sleeves when the frame is in substantially the position shown in Fig. 4. The inner ends of the strips or members 52, 53, are provided with stops 56 which may comprise inwardly bent ends of said strips, to prevent the separation of the members 52, 53 from the sleeves 55. The strip 53 is longer than the strip 52 for the reason hereinafter described.

The outer ends of the members 52, 53 are hingedly connected but separably so. The hinge comprises two arms or members 57, 58, the member 57 being rigidly secured to the strip 52 as by a rivet. The two hinge members 57, 58 are connected by a pintle 59.

The arm of hinge member 57 is provided with inwardly turned ears 60 which overlap the edges of strip 52, but said strip 52 terminates at a point so as to leave portions of the ears 60 to constitute a keeper for the end of the spring member 53, which is slidable into and out of such keeper. The hinge member 58 is provided with inwardly turned ears 61 forming a slide-way for the strip 53 so that said strip 53 can be slid into the keeper of the hinge member 57, as shown in Fig. 6, so as to hold the hoop frame in the form shown in Fig. 1, or may be slid out of said keeper to permit the members of the hoop frame to be collapsed, as shown in Fig. 4. Since the strip 53 is slidable, as just described, it is longer than the strip 52 so that the stop 56 of the strip 53 will not prematurely contact with the sleeve 55 so as to prevent said strip 53 from being slid to the position shown in Figs. 6 and 7. To limit the outward or releasing movement of the strip 53, I form the hinge member 58 with the slot 62 which receives a stop tongue 63 projecting downwardly from the strip 53. This connection, however, is a separable one in order that the netting can be conveniently removed or applied. By bending the strip 53 upwardly, as indicated in Fig. 8, sufficiently to enable the stop tongue 63 to clear the outer end of the slot 62, said strip 53 can be entirely released and then the edge loops of the netting can be slipped over the two sides of the frame, some of the loops passing directly on to the freed strip 53 and other loops passing over the outer hinge members and on the strip 52, the netting being then slipped along over the strips 50, 51, and secured by suitable tie cords passing through the eyes 49.

In order that the netting may be additionally secured by tie cords, I provide the outer hinge members 57, 58 with slots or eyes 64.

With this structure so far described, it being understood that the netting is attached to the hoop as described, said hoop and the netting may be entirely stored within the tubular handle. To do this the frame is collapsed even more closely than shown in Fig. 4, the outer strips 52, 53 are slid downwardly so as to reduce the length of the collapsed hoop to nearly one-half the length shown in Fig. 4, the netting is wrapped around the collapsed frame, and the whole then pushed into the handle and the cap 34 applied. It is to be understood that when this is done the cone wedge 39 is not acting to expand the block 35. To place the device in condition for use, the cap 34 is removed and the jointed outer end is grasped so as to pull the frame and netting outwardly, the block 35 sliding from the position shown in Fig. 5 to the position shown in Fig. 4, the lugs 33 of the handle preventing the block from being pulled entirely out. If the drawing-out action has not brought the recesses 38 of the plug into alinement with the lugs 33, a slight rotary movement will bring them into such alinement and the plug is then pulled out to the limit prescribed by contact of the lugs 33 with the bottoms of the recesses 38. This locks the block 35 against rotation. Since the arms 44 are connected to the screw 41, the frame is simply held in one hand and the handle in the other, and by a rotary movement of one or the other the screw 41 is caused to impart a longitudinal movement to the cone wedge 39 because the cone wedge cannot rotate relatively to the block 35. Such longitudinal movement of the cone wedge expands the block 35 so that it will be locked firmly in position at the outer end of the tubular handle. The user then grasps the outer portions of the collapsed frame and opens them to about the position shown in Fig. 7 and then slides the end of strip 53 into the keeper presented by the ears 60, the said outer end of the strip 53 acting as a bolt to keep the two outer hinge members in substantial alinement with each other, as shown in Figs. 1 and 7. At this time the inner arms or hinge members 44 have not opened out to the position shown in Fig. 1, but they have opened sufficiently so that a slight further rotary movement of the handle relatively to the net frame causes the washer 43 to bear against the toes 46 and spread the arms 44 until the flattened or straight portions 47 of the said hinge members 44 are brought square against the outer face of washer 43, as indicated in Fig. 1. It is to be understood, of course, that the bringing of the outer portions of the frame to the position shown in Fig. 1, acts through the strips to open out the inner hinge members 44 considerably farther than shown in Fig. 5, so that the toes 46 will pass somewhat beyond the line of movement when traveling from the position shown in Fig. 5 to the position shown in Fig. 4 so that said toes will be in position to be acted upon by the washer to spread the members 44 in the manner just described.

Instead of sliding the net frame and net directly into the tubular handle, the frame may be disconnected from the end to which it is connected for use and inserted from the other end. A structure permitting this to be done is illustrated in Fig. 11, whereby it will be seen that the outer or lower end of the handle 30 is provided with a plug 70 having an annular groove 71 which receives one or both ends of the bail 32, said bail being a resilient one that will cause it to lock the plug 70 in place but which will yield enough to permit the plug to be removed. The other end of the handle is closed excepting at a central opening and contains a block 73 which is permanently secured in place as by being pinned in. The block 73 is provided with a central aperture which is internally screw threaded to receive the screw 74 which is similar to the screw 41 in Fig. 4. In other respects the structure is or may be the same as in the form first described. When the net frame and the net have been collapsed, the screw 74 can be entirely removed from the block 73, the plug 70 removed, and the hoop frame and net can then be slipped into the tubular handle and the plug 70 restored to place. The operation of expanding and collapsing the net frame will be the same as already described in connection with Figs. 1, 4 and 5.

I claim:—

1. A device of the character described, comprising two members hingedly connected at their inner and outer ends, each member comprising a plurality of sections slidably connected to vary the length of the members.

2. A device of the character described, comprising a net frame composed of two members hingedly connected at their inner and outer ends, each member comprising a plurality of resilient sections slidably connected to vary the length of the members.

3. A device of the character described, comprising a net frame composed of a plurality of sections slidably connected together at two points and hingedly connected together at two other points.

4. A device of the character described, comprising a collapsible net frame, means for varying the length of the frame when collapsed, and a hollow handle for containing said frame.

5. A landing net comprising a net frame having members hingedly connected at their inner and outer ends, one of the outer hinge members having a keeper, the other outer hinge member having a frame member slidable relatively to it to engage and disengage the said keeper.

6. A landing net frame comprising a pair of inner resilient strips hingedly connected, and a pair of outer resilient strips hingedly connected, the outer and inner pairs being slidably connected.

7. A landing net frame comprising a pair of inner resilient strips hingedly connected, a pair of outer resilient strips hingedly connected, the outer and inner pairs being slidably connected, a screw on which the frame is mounted, and a handle having means for supporting said screw and its attached frame.

8. A landing net frame comprising a pair of inner resilient strips hingedly connected and having sleeves, and a pair of outer resilient strips hingedly connected and extending through said sleeves, means being provided for preventing separation of the outer strips from the inner strips.

9. A landing net frame comprising a pair of inner resilient strips hingedly connected and having sleeves, and a pair of outer resilient strips hingedly connected and extending through said sleeves, the inner ends of the outer strips being bent to present stops to contact with the sleeves of the inner strips to limit outwardly sliding movement of the outer pair of strips.

10. A landing net frame comprising a pair of inner resilient strips hingedly connected and having sleeves, a pair of outer resilient strips slidably mounted in said sleeves, one strip of the outer pair being longer than the other strip of that pair, means being provided for preventing separation of the outer strips from said sleeves, hingedly connected arms at the outer ends of the outer pair of strips, one of said arms being permanently connected to one of said strips and having a keeper, the other outer strip being slidable relatively to the other arm of the hinge connection whereby the outer end of the last-mentioned resilient strip may engage the keeper.

11. A landing net comprising a net frame having members hingedly connected at their inner and outer ends, one of the outer hinge members having a keeper, the other outer hinge member having a frame member slidable relatively to it to engage and disengage the said keeper, and means whereby the last-mentioned frame member may be disengaged from its outer hinge member.

12. A landing net comprising a net frame having members hingedly connected at their inner and outer ends, one of the outer hinge members having a keeper, the other outer hinge member having a frame member slidable relatively to it to engage and disengage the said keeper, the last-mentioned hinge member having a slot, the frame member that is connected thereto having a stop tongue movable along said slot.

13. A landing net comprising a hollow handle, an expansible block slidingly mounted in said handle, means for expanding said block, means for preventing rotation of the block while being expanded, and a collapsible net frame connected with said block.

14. A landing net comprising a hollow handle having an inwardly projecting lug near one end, an expansible block slidably mounted in said handle and having a recess for said lug and also having a cone shaped recess, a cone wedge mounted in the recess of the block and having a threaded aperture and provided with a radial pin to engage the block, a screw engaging the threaded aperture of the cone wedge, and a collapsible net frame connected with said screw.

In testimony whereof I have affixed my signature, in presence of two witnesses.

HARRY LEVY.

Witnesses:
 A. W. HARRISON,
 P. N. PEZZETTI.